(12) United States Patent
Noda et al.

(10) Patent No.: US 7,537,717 B2
(45) Date of Patent: May 26, 2009

(54) METHOD OF MANUFACTURING TWO-LAYER ROLL AND METHOD OF MANUFACTURING CYLINDRICAL MEMBER

(75) Inventors: Takashi Noda, Yokohama (JP); Junya Hoshi, Yokohama (JP); Takeshi Yanobe, Yokohama (JP); Shinobu Hasegawa, Yokohama (JP)

(73) Assignee: Synztec Co., Ltd., Tokyo (JP)

( * ) Notice: Subject to any disclaimer, the term of this patent is extended or adjusted under 35 U.S.C. 154(b) by 931 days.

(21) Appl. No.: 10/892,492

(22) Filed: Jul. 16, 2004

(65) Prior Publication Data

US 2005/0029693 A1 Feb. 10, 2005

(30) Foreign Application Priority Data

Jul. 17, 2003 (JP) ............................. 2003-276114
Jul. 6, 2004 (JP) ............................. 2004-199761

(51) Int. Cl.
*B29C 44/00* (2006.01)
(52) U.S. Cl. ...................................... 264/46.9; 264/162
(58) Field of Classification Search ................ 264/45.1, 264/46.4, 46.9, 162
See application file for complete search history.

(56) References Cited

U.S. PATENT DOCUMENTS 4,956,211 A * 9/1990 Saito ......................... 428/36.5
6,780,364 B2 * 8/2004 Chiang et al. ............... 264/240
2006/0280928 A1 * 12/2006 Imasaka et al. .......... 428/304.4

FOREIGN PATENT DOCUMENTS

| JP | 4-214579 A | 8/1992 |
|----|-----------|--------|
| JP | 5-281831 A | 10/1993 |
| JP | 6-24733 B2 | 4/1994 |
| JP | 6-175470 A | 6/1994 |
| JP | 6-242659 A | 9/1994 |
| JP | 8-66929 A | 3/1996 |
| JP | 2002-040760 A | 2/2002 |
| JP | 2002-244457 A | 8/2002 |

* cited by examiner

Primary Examiner—James Sells
(74) Attorney, Agent, or Firm—Sughrue Mion, PLLC (57) ABSTRACT

A method of manufacturing a two-layer roll having a foamed elastic layer provided on a core, and an elastic layer provided on the foamed elastic layer includes the steps of forming the elastic layer by use of a cylindrical mold holding a first cylindrical member used to form the outer cylindrical surface of the elastic layer, the first cylindrical member being manufactured by means of machining a solid member; forming a solid primary layer on the core by means of side extrusion; setting the formed elastic layer and the core having the solid primary layer formed thereon in a second cylindrical member of a foaming mold; and foaming the solid primary layer into the foamed elastic layer to form the two-layer roll having the formed elastic layer and the elastic layer.

12 Claims, 5 Drawing Sheets

METHOD OF MANUFACTURING TWO-LAYER ROLL AND METHOD OF MANUFACTURING CYLINDRICAL MEMBER

BACKGROUND OF THE INVENTION

1. Field of the Invention

The present invention relates to a method of manufacturing a two-layer roll and a method of manufacturing a cylindrical member, the methods being favorably applicable to manufacture of rolls having high dimensional accuracy, particularly developing rolls, transfer rolls, paper feed rolls, and transport rolls for use in image forming apparatus, such as electrophotographic copiers and printers and toner-jet copiers and printers; particularly, the methods being favorably applicable to manufacture of charge rolls used to establish a uniform electrostatic charge on, for example, photoconductive members of such image forming apparatus and required to have high dimensional accuracy.

2. Description of the Related Art

Charge rolls of image forming apparatus, such as electrophotographic copiers and printers, must not cause contamination of, for example, photoconductive members and must have predetermined conductivity. In order to meet the requirements, conventionally used charge rolls are of polyurethane or silicone rubber. In view of, for example, prevention of contamination of photoconductive members and establishment of electrostatic charge, conventionally proposed charge rolls are configured such that a coating layer, a surface treatment layer, or a covering tube is provided on the surface of an elastic layer (refer to Japanese Patent Application Laid-Open (kokai) Nos. 06-175470, 05-281831, 2002-040760, and 04-214579). Conventionally, in order to maintain a charging property, charge members have been required to have high accuracy in outside diameter. According to general practice, to meet the requirement, after an elastic layer is polished, a coating layer, a surface treatment layer, or a covering tube is provided on the polished surface of the elastic layer as mentioned above.

In recent years, charge rolls have been required to have a more stable charging property, as well as to reduce discharge noise and cost.

On the basis of the concept that requirements of low cost and high charging property are met by a charge roll that has very low hardness in order to provide a sufficient nip width, at some sacrifice of dimensional accuracy, an attempt has been made to impart to a charge roll the structure such that an elastic layer having high conductivity and low hardness is covered with a tubular surface layer.

In this connection, the present inventors focused attention on a transfer member that the assignee of the present inventor had previously developed (refer to Japanese Patent Application Laid-Open (kokai) No. 2002-244457). The transfer member includes a conductive, elastic foamed layer provided on a support member, and a parting layer provided on the conductive, elastic foamed layer. The parting layer is a sleeve member that is previously formed of a conductive resin. However, the disclosed resin tube fails to provide a target low hardness. When low hardness is imparted to the conductive, elastic foamed layer, the layer cannot be covered with the resin tube after the layer is polished. Thus, the conductive, elastic foamed layer must be formed through foaming within the resin tube. However, the process of foaming within the resin tube fails to provide a roll having low hardness.

A two-layer roll has conventionally been formed as follows. An elastic layer and a foamed elastic layer are formed separately. Specifically, the elastic layer is formed by the steps of molding and polishing, whereas the foamed elastic member is formed by the steps of preforming, foaming, and polishing. An adhesive is applied to the outer surface of the foamed elastic member. The thus-prepared foamed elastic layer is covered with the elastic layer, followed by heat treatment.

The above method of manufacturing a two-layer roll requires a molding (or forming) step and a polishing step for each of the elastic layer and the foamed elastic layer, as well as a step of bonding the elastic layer and the foamed elastic layer. Thus, the manufacturing process becomes complicated and involves high cost.

A conventionally proposed apparatus for manufacturing a roller without a parting line includes a cylindrical seamless pipe held within the cavity of a split mold; spring-type pressure-absorbing means provided at one end of the seamless pipe and adapted to absorb cavity pressure that increases with expansion of unvulcanized rubber charged in the seamless pipe, in the course of vulcanization molding of the rubber; and pressure-reducing means provided at the other end of the seamless pipe and adapted to gradually reduce the equilibrium pressure between the cavity pressure and the spring force of the spring-type pressure-absorbing means when the split mold is opened (refer to Japanese Patent Application Laid-Open (kokai) No. 8-66929).

A conventionally proposed method of manufacturing a two-layer roll includes the steps of forming a silicone sponge layer through molding and polishing; placing the silicone sponge layer in a cylindrical mold, which can be split along the axial direction; injecting liquid silicone into the mold to thereby form a surface rubber layer on the silicone sponge layer; and polishing the surface rubber layer, to thereby obtain a two-layer roll (refer to Japanese Patent Publication (kokoku) No. 6-24733).

A conventionally proposed method of manufacturing a charge member employs a crown-shaped core so as to impart a crown shape to an elastic member, thereby yielding a crown-shaped charge member (refer to Japanese Patent Application Laid-Open (kokai) No. 6-242659).

Since a charge roll must have high dimensional accuracy, polishing is generally performed after molding so as to satisfy required dimensional accuracy. However, dimensional accuracy established by means of polishing tends to vary among charge rolls having low hardness. Meanwhile, when polishing is not performed, axial straightness becomes 0.3 mm to 0.5 mm.

A two-layer roll manufactured by the above-mentioned method has problems in that the center of the outer circumferential surface deviates from the axis of rotation, and the axial straightness deteriorates with resultant run-out of the axis.

A cylindrical member used in a foaming mold for forming the foamed elastic layer or in a cylindrical mold for forming the elastic layer is formed by the steps of performing external cylindrical turning on a structural pipe while using the inner circumferential surface of the pipe as a reference; and honing the internal cylindrical surface of the pipe. However, since an axial straightness deviation of about 1 mm is permitted for a structural pipe, even honing cannot improve the straightness. As a result, a cylindrical member having straightness of high degree cannot be obtained. When such a cylindrical member having poor straightness is used to form a mold, a roll manufactured by use of the mold exhibits poor dimensional accuracy.

SUMMARY OF THE INVENTION

In view of the foregoing, an object of the present invention is to provide a method of manufacturing a two-layer roll exhibiting high dimensional accuracy, without involvement of polishing, as well as a method of manufacturing a cylindrical member to be used in the method of manufacturing a two-layer roll.

To achieve the above object, a first aspect of the present invention provides a method of manufacturing a two-layer roll having a foamed elastic layer provided on a core, and an elastic layer provided on the foamed elastic layer. The method comprises the steps of forming the elastic layer, which has a length of 200 mm to 400 mm and outside diameter of 16 mm or less, by use of a cylindrical mold holding a first cylindrical member used to form an outer cylindrical surface of the elastic layer, the first cylindrical member being manufactured by means of machining a solid member, and the first cylindrical member having an inside-diameter error of ±0.02 mm or less and an axial straightness deviation of 0.02 mm or less; forming a solid primary layer, which has a length of 200 mm to 400 mm and is to be foamed into the foamed elastic layer, on the core by means of side extrusion; setting the formed elastic layer and the core having the solid primary layer formed thereon in a second cylindrical member of a foaming mold, the second cylindrical member having an inside-diameter error and an axial straightness deviation substantially equal to those of the first cylindrical member; and foaming the solid primary layer into the foamed elastic layer to form the two-layer roll having the formed elastic layer and the elastic layer, the formed elastic layer and the elastic layer, the formed elastic layer and the elastic layer having a length of 200 mm to 400 mm.

According to a second aspect of the present invention, in the first aspect, the first and second cylindrical members have an inside-diameter error of ±0.01 mm or less.

According to a third aspect of the present invention, in the first or second aspect, a method of manufacturing each of the first and second cylindrical members comprises the steps of drilling a primary bore in the solid member, which serves as a cylindrical-member workpiece; performing external cylindrical turning on the cylindrical-member workpiece while using the center of the primary bore as a reference; finishing at least one end face of the cylindrical-member workpiece into a reference face; and honing an internal cylindrical surface of the primary bore while using the reference face as a reference, thereby obtaining a finished bore.

According to a fourth aspect of the present invention, in the third aspect, the method of manufacturing each of the first and second cylindrical members further comprises the step of quenching the cylindrical-member workpiece, before the step of finishing an end face of the cylindrical-member workpiece into a reference face.

According to a fifth aspect of the present invention, in the fourth aspect, a parting agent is not used for formation of the elastic layer.

According to a sixth aspect of the present invention, in any one of the third to fifth aspects, in the step of finishing an end face of the cylindrical-member workpiece into a reference face, opposite end faces of the cylindrical-member workpiece are finished into corresponding reference faces.

According to a seventh aspect of the present invention, in any one of the third to sixth aspects, the method of manufacturing the second cylindrical member further comprises the step of, after the step of forming the finished bore, performing external cylindrical finishing on the cylindrical-member workpiece while using the center of the finished bore as a reference.

According to an eighth aspect of the present invention, in any one of the first to seventh aspects, an external cylindrical surface of the elastic layer does not undergo polishing and is treated by use of a surface treatment liquid that contains isocyanate, thereby forming a surface treatment layer.

According to a ninth aspect of the present invention, in the eighth aspect, the surface treatment liquid further contains at least either a conductivity imparting agent or at least one polymer selected from acrylic fluorine-containing polymers and acryl-silicone polymers.

According to a tenth aspect of the present invention, in the eighth or ninth aspect, the surface treatment is performed before or after the step of foaming.

According to an eleventh aspect of the present invention, in any one of the first to tenth aspects, an adhesive agent is not provided between the foamed elastic layer and the elastic layer.

According to a twelfth aspect of the present invention, in any one of the first to eleventh aspects, the elastic layer has a thickness of 0.3 mm to 1.2 mm.

A thirteenth aspect of the present invention provides a method of manufacturing a cylindrical member. The method comprises the steps of drilling a primary bore in a solid member, which has a length of 200 mm to 400 mm and serves as a cylindrical-member workpiece; performing external cylindrical turning on the cylindrical-member workpiece while using the center of the primary bore as a reference; finishing at least one end face of the cylindrical-member workpiece into a reference face; and honing an internal cylindrical surface of the primary bore while using the reference face as a reference, thereby obtaining the cylindrical member with a finished bore, the cylindrical member having a length of 200 mm to 400 mm and an internal diameter of 16 mm or less.

According to a fourteenth aspect of the present invention, the method of the thirteen aspect further comprises the step of, after the step of forming the finished bore, performing external cylindrical finishing on the cylindrical-member workpiece while using the center of the finished bore as a reference.

According to a fifteenth aspect of the present invention, the method of the thirteenth or fourteenth aspect further comprises the step of quenching the cylindrical-member workpiece, before the step of finishing an end face of the cylindrical-member workpiece into a reference face.

According to a sixteenth aspect of the present invention, in any one of the thirteenth to fifteenth aspects, in the step of finishing an end face of the cylindrical-member workpiece into a reference face, opposite end faces of the cylindrical-member workpiece are finished into corresponding reference faces.

According to a seventeenth aspect of the present invention, in any one of the thirteenth to sixteenth aspects, the finished bore assumes such a crown shape whose diameter decreases gradually toward opposite ends from a longitudinally central portion thereof.

The method of the present invention can readily and reliably form a cylindrical member exhibiting high accuracy in inside and outside diameters and high degree in axial straightness and can readily form a two-layer roll having high dimensional accuracy by use of a mold that uses the thus-formed cylindrical member.

The present invention can provide a method of manufacturing, in a small number of steps, a two-layer roll which exhibits excellent conductivity and excellent charging property and does not cause contamination and whose discharge noise level is low, as well as a method of manufacturing a cylindrical member to be used in the method of manufacturing a two-layer roll.

DESCRIPTION OF THE PREFERRED EMBODIMENTS

Embodiments of the present invention will next be described in detail with reference to the drawings.

(First Embodiment)

A two-layer roll according to a first embodiment of the present invention is a charge roll used to establish a uniform electrostatic charge on, for example, a photoconductive member of image forming apparatus, such as an electrophotographic copier or printer, or a toner-jet copier or printer.

Figure 1A:
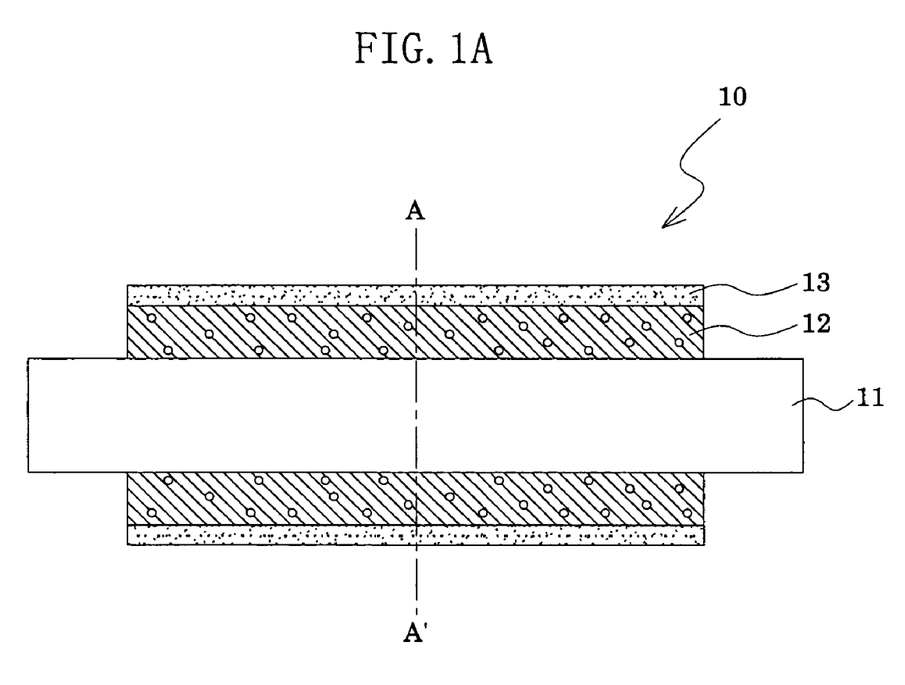
FIG. 1A is a schematic longitudinal sectional view of a charge roll manufactured by a method according to a first embodiment of the present invention.
Figure 1B:
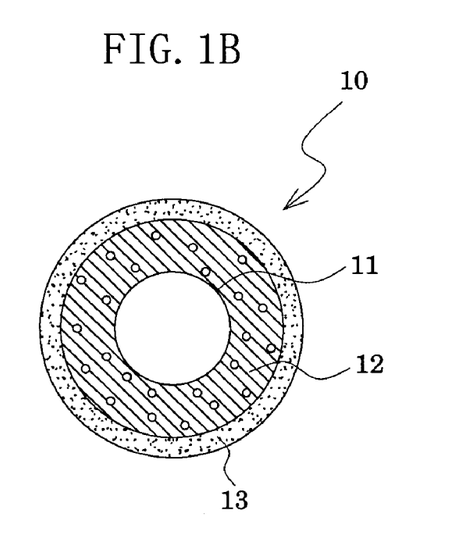
FIG. 1B is a sectional view taken along line A-A' of FIG. 1A.

FIG. 1 shows a charge roll by means of sectional views.

As shown in FIG. 1, a charge roll 10 includes a core 11, a foamed elastic layer 12 provided on the core 11, and an elastic layer 13 provided on the foamed elastic layer 12. The surface of the elastic layer 13 is treated to thereby form a surface treatment layer.

In order to form the foamed elastic layer 12 provided on the core 11 of the charge roll 10, the present embodiment uses, for example, a nitrile rubber foam, which contains nitrile rubber, conductive carbon black, and a plasticizer (28 parts by weight or more per 100 parts by weight of nitrile rubber), which exhibits an electric resistance of $1.0 \times 10^5$ $\Omega$ or less when 100 VDC is applied, and which has an Asker C rubber hardness of 40°. No particular limitation is imposed on the nitrile rubber. However, in view of gas permeability, which will be described later, nitrile rubber having a nitrile content of 31% or higher; i.e., nitrile rubber of intermediate nitrile content, high nitrile content, or very high nitrile content, is preferred.

In view of easiness of foaming, nitrile rubber having low Mooney viscosity; e.g., nitrile rubber having a Mooney viscosity ($ML_{1+4}$ at 100° C.) of 45 or lower is preferred. Alternatively, hydrogenated NBR may be used. In this case, in order to avoid permanent set in fatigue which could otherwise result from peroxide cross-link, percent hydrogenation is preferably 95 or less.

In order for the charge roll 10 to satisfactorily function, the electric resistance of the foamed elastic layer 12 is preferably $1.0 \times 10^5$ $\Omega$ or less. Thus, conductive carbon black, which serves as a conductivity imparting agent, is added such that the electric resistance of the foamed elastic layer 12 is $1.0 \times 10^5$ $\Omega$ or less. For example, conductive carbon black may be added in an amount of 25 parts by weight or more per 100 parts by weight of nitrile rubber. No particular limitation is imposed on the kind of conductive carbon black. Examples of conductive carbon black include KETJEN BLACK (product of Lion Corp.) and TOKABLACK #5500 (product of Tokai Carbon Co., Ltd.).

In order for the charge roll 10 to provide sufficient nip, the rubber hardness of the foamed elastic layer 12 is preferably Asker C 40° or less. Employment of such low hardness allows setting of a wide nip width, so that a uniform electrostatic charge can be established. Rubber hardness on the Asker C scale was measured under a fixed load of 1,000 gf by use of a test piece having a thickness of 12 mm or more. The test piece was prepared under the same conditions as employed for the foamed elastic layer 12. When the actual rubber hardness of the foamed elastic layer 12 is measured in the following manner, a measured rubber hardness is substantially identical with that measured by use of the test piece: the elastic layers 13 and the foamed elastic layers 12 are removed from the manufactured charge rolls 10; the removed foamed elastic layers 12 are stacked such that their total thickness becomes 12 mm or more; and the stack of the foamed elastic layers 12 is measured for rubber hardness.

When, as mentioned above, conductive carbon black is added in such an amount that the electric resistance of the foamed elastic layer 12 becomes $1.0 \times 10^5$ $\Omega$ or less, and as a result of addition, hardness increases. Thus, in order to lower hardness, a plasticizer must be added.

In the case where carbon black is added in such a amount that the electric resistance of the foamed elastic layer 12 becomes $1.0 \times 10^5$ $\Omega$ or less, a plasticizer must usually be added in an amount of about 70 to 80 parts by weight per 100 parts by weight of base rubber. However, since nitrile rubber used in the present invention has low gas permeability and can assume low hardness when foamed to a high degree of expansion, the amount of a plasticizer to be added may be reduced to, for example, 28 to 40 parts by weight per 100 parts by weight of nitrile rubber. Since the amount of a plasticizer added is small, the charge roll 10 in contact with a photoconductive member does not cause contamination of the photoconductive member which could otherwise result from plasticizer migration to the outer surface of the charge roll 10. When a plasticizer is added in large amount, kneading becomes difficult. In the present embodiment, since the plasticizer content is low, kneading can be favorably performed. No particular limitation is imposed on a plasticizer. Examples of a plasticizer include polar oil, such as di-(2-ethylhexyl) phthalate (DOP) When DOP is used as a plasticizer, the charge roll 10 does not cause contamination, conceivably because DOP becomes unlikely to migrate to the elastic layer 13, which is formed from epichlorohydrin rubber.

Preferably, a foam used to form the foamed elastic layer 12 exhibits a degree of expansion of 2.0 to 4.0 times. Degree of expansion will be described later in detail, but is determined by the ratio between the space between the elastic layer 13 and a solid primary layer, which will become the foamed elastic layer 12, and the quantity of the solid primary layer. The solid primary layer to be used must foam more than 2.0 to 4.0 times when allowed to foam under free conditions.

Through use of such a solid primary layer, the foamed elastic layer 12 and the elastic layer 13 can be tightly fitted together to thereby be joined strongly.

Foaming conditions are specified and regulated as follows: the kind and quantity of a foaming agent are specified in order to attain a target degree of expansion under free conditions; the thickness of a solid primary layer to be provided on the core 11 is controlled with high accuracy; and heating conditions and other relevant conditions are set appropriately. A foam may be of closed-cell type or open-cell type. Since nitrile rubber used in the present invention exhibits low gas permeability, the above-mentioned conductive, elastic layer foamed at high degree of expansion can be formed from nitrile rubber without need to add a gas permeation inhibitor or a like agent. Thus, the charge roll 10 is free from an impairment in properties which could otherwise result from addition of a gas permeation inhibitor or a like agent. Preferably, a nitrile rubber foam has an average cell diameter of 100 μm to 300 μm.

In the present embodiment, the elastic layer 13 provided on the foamed elastic layer 12 is of, for example, epichlorohydrin rubber.

Examples of epichlorohydrin rubber include epichlorohydrin homopolymer, epichlorohydrin-ethylene oxide copolymer, epichlorohydrin-allyl glycidyl ether copolymer, and epichlorohydrin-ethylene oxide-allyl glycidyl ether ternary copolymer.

The surface of the elastic layer 13 is treated by use of a surface treatment liquid that contains isocyanate, thereby forming a surface treatment layer. The surface treatment layer may be formed before or after provision of the foamed elastic layer 12.

The surface treatment layer is formed by means of impregnation with a surface treatment liquid that contains isocyanate. The surface treatment liquid may be a solution prepared by dissolving an isocyanate compound in an organic solvent, or may be prepared by adding carbon black to the solution. Preferably, the surface treatment liquid contains an isocyanate component and at least either a conductivity imparting agent or at least one polymer selected from acrylic fluorine-containing polymers and acryl-silicone polymers.

Examples of isocyanate compounds include 2,6-tolylene diisocyanate (TDI), 4,4'-diphenylmethane diisocyanate (MDI), p-phenylene diisocyanate (PPDI), 1,5-naphthalene diisocyanate (NDI), 3,3-dimethylphenyl-4,4'-diisocyanate (TODI), and oligomers and modified compounds thereof.

Acrylic fluorine-containing polymers and acryl-silicone polymers are soluble in appropriate solvents and can chemically combine with an isocyanate compound through reaction. Acrylic fluorine-containing polymers are fluorine-containing polymers soluble in a solvent and having, for example, hydroxyl, alkyl, or carboxyl. Examples of acrylic fluorine-containing polymers include block copolymers of acrylate ester and fluoroalkyl acrylate, and their derivatives. Acrylsilicone polymers are silicone polymers soluble in appropriate solvents. Examples of acryl-silicone polymers include block copolymers of acrylate ester and siloxane acrylate ester, and their derivatives. These polymers can be used singly or in combination. Preferably, the amount of a polymer contained in a surface treatment liquid is 2 wt. % to 30 wt. % based on the amount of an isocyanate component. When the polymer content falls below this range, the effect of retaining carbon black within a surface treatment layer deteriorates. When the polymer content falls above this range, the relative isocyanate component content drops, resulting in a failure to form an effective surface treatment layer.

Preferably, the surface treatment liquid contains carbon black as a conductivity imparting agent. No particular limitation is imposed on the kind of carbon black. Examples of carbon black products are as mentioned previously. Preferably, the carbon black content of the surface treatment liquid is 10 wt. % to 40 wt. % based on the amount of an isocyanate component. When the carbon black content falls below this range, an effective charging property is not exhibited. When the carbon black content falls above this range, separation or a like problem arises.

The surface treatment liquid contains a solvent used to dissolve an acrylfluorine or acryl-silicone polymer, and an isocyanate compound. No particular limitation is imposed on the solvent. However, an organic solvent, such as ethyl acetate, methyl ethyl ketone (MEK), or toluene, is preferred.

Provision of a surface treatment layer as a surface layer of the charge roll 10 prevents a plasticizer contained in the foamed elastic layer 12 from bleeding to the surface of the charge roll 10, so that the charge roll 10 does not contaminate a photoconductive member with the plasticizer.

The rubber hardness of the elastic layer 13 is preferably JIS A 35° to 75°, more preferably 45° to 70°. When the rubber hardness of the elastic layer 13 falls below this range, the charge roll 10 fails to provide required durability. When the rubber hardness falls above this range, the hardness of the charge roll 10 becomes excessively high.

The surface roughness Ra of the elastic layer 13 is preferably 8μm or less, more preferably 6 μ or less, most preferably 2.5 μm or less. When the surface roughness Ra is 8 μm or less, the charge roll 10 can be such that toner becomes unlikely to adhere thereto. However, when the surface roughness Ra is greater than 8 μm, but is not greater than 12 μm, the charge roll 10 may be used with toner of a certain kind.

Preferably, the thickness of the elastic layer 13 is 0.3 mm to 1.2 mm. No particular limitation is imposed on the diameter of the entire charge roll 10 and on the diameter of the core 11. However, since the charge roll 10 in ordinary use has an outside diameter of 16 mm or less and a diameter of the core 11 of about 6 mm to 8 mm, a favorable range of the thickness of the elastic layer 13 is determined accordingly. Also, the charge roll 10 in ordinary use has a length of 200 mm to 400 mm.

The charge roll 10 of the present invention can have an electric resistance of $10^4$ Ω to $10^7$ Ω when 100 VDC is applied, in various environments from low-temperature low-humidity environment (10° C., 30% RH) to high-temperature high-humidity environment (40° C., 80% RH).

The charge roll 10 of the present invention uses a nitrile rubber foam having high degree of expansion and low hardness to form the foamed elastic layer 12, and epichlorohydrin rubber to form the elastic layer 13, so that discharge noise level can be lowered at the time of use.

Figure 2A:
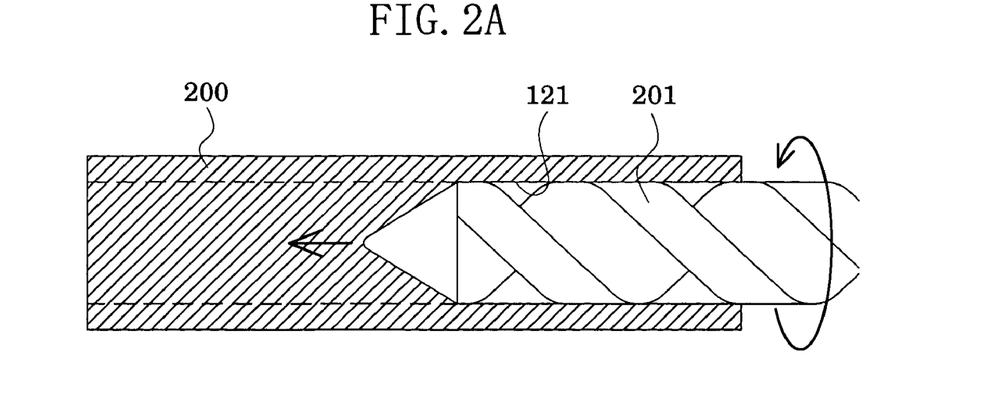
FIGS. 2A to 2C are schematic sectional views showing the steps of manufacturing a cylindrical member by the method according to the first embodiment.
Figure 2B:
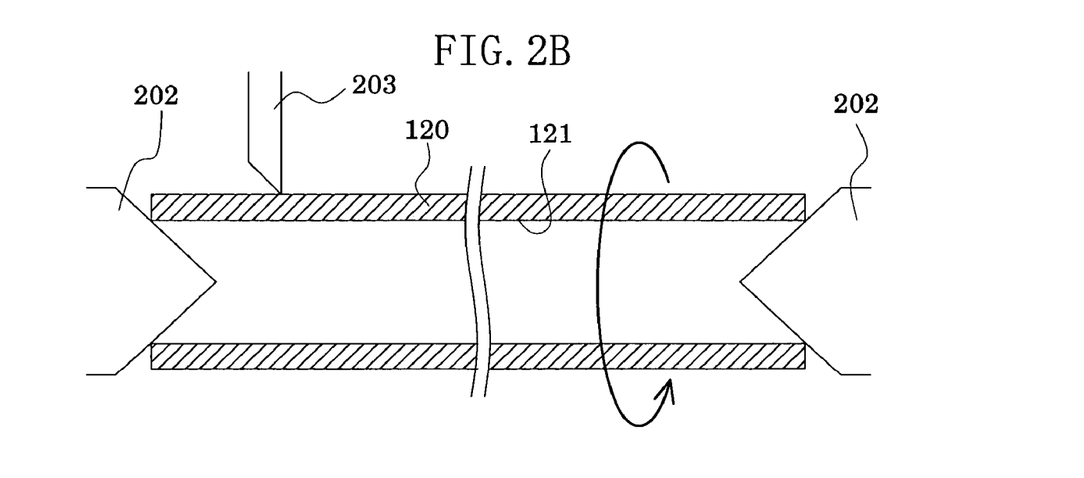
Figure 2C:
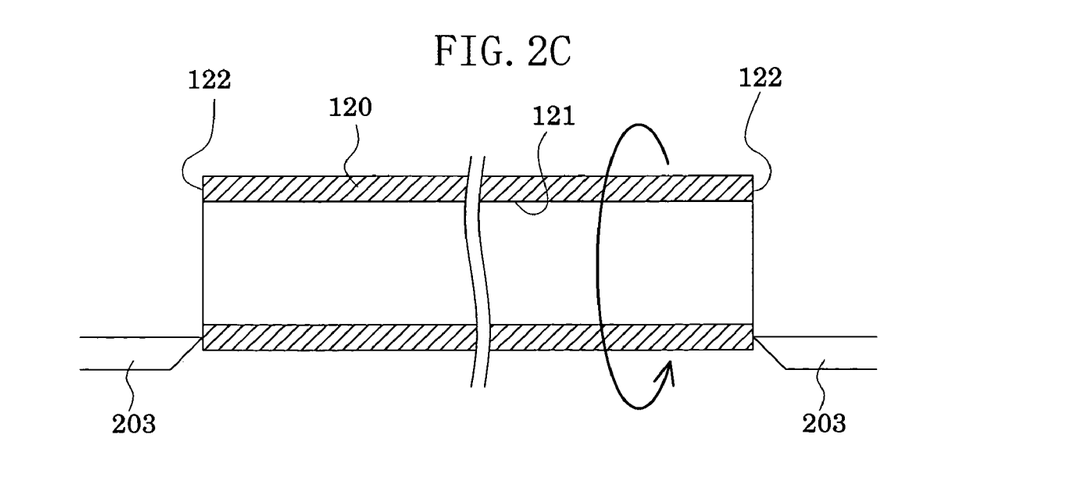
Figure 3A:
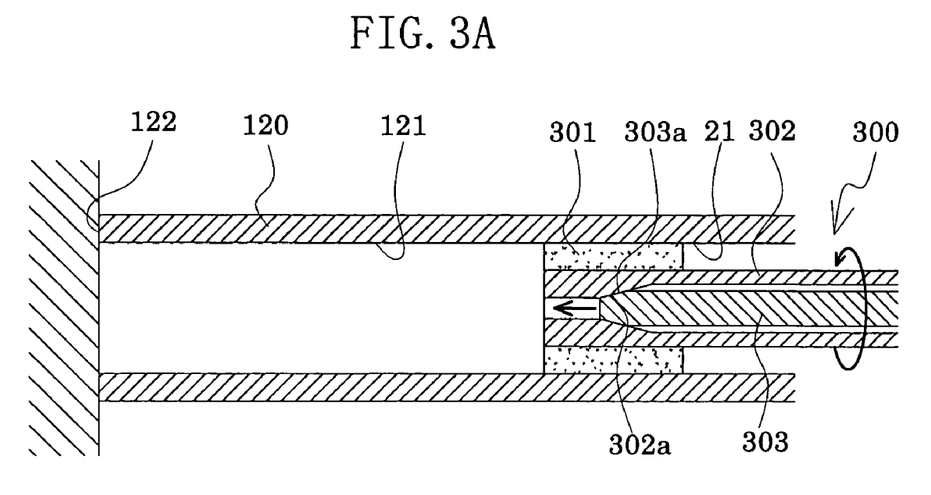
FIGS. 3A and 3B are schematic sectional views showing the steps of manufacturing the cylindrical member by the method according to to the first embodiment, continued from FIG. 2C.
Figure 3B:
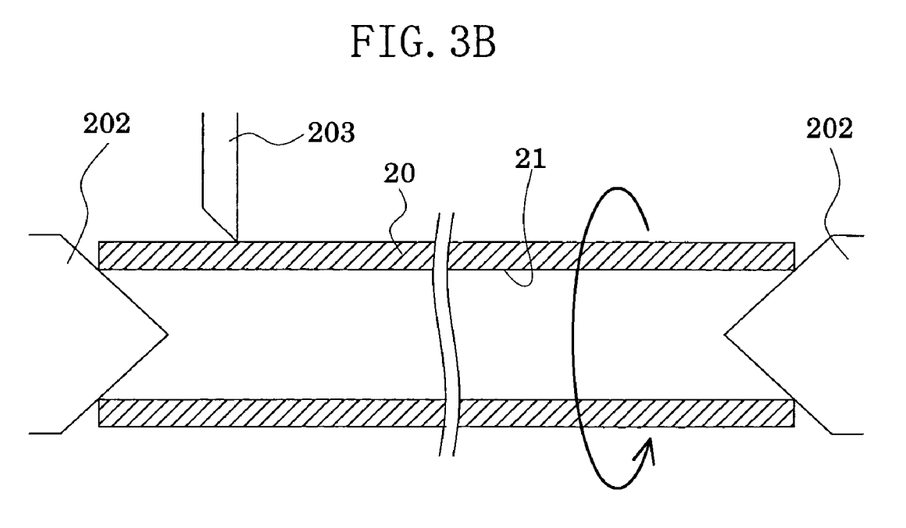
Figure 4A:
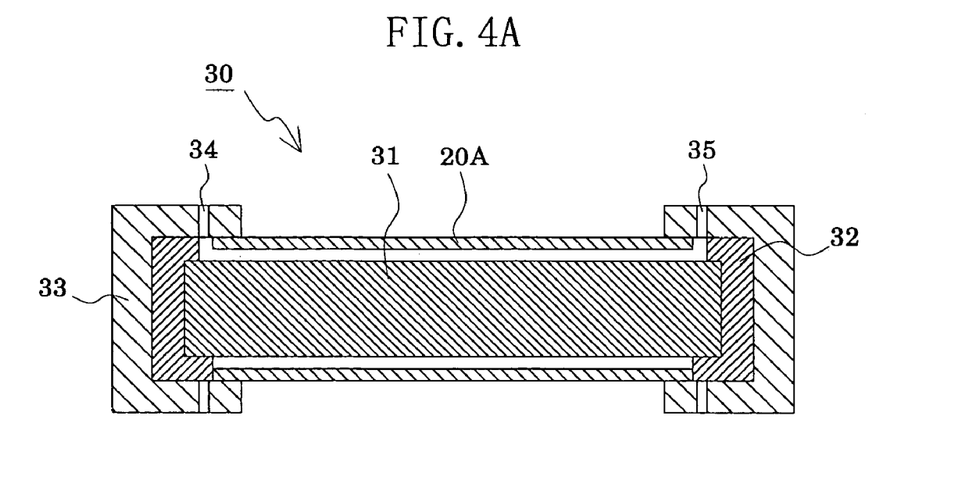
FIGS. 4A to 4C are schematic sectional views showing the steps of manufacturing the charge roll by the method according to the first embodiment.
Figure 4B:
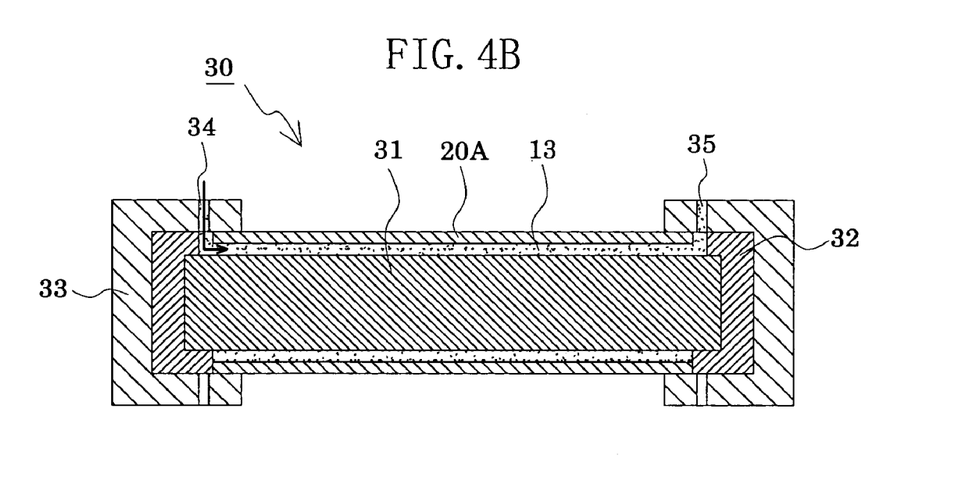
Figure 4C:
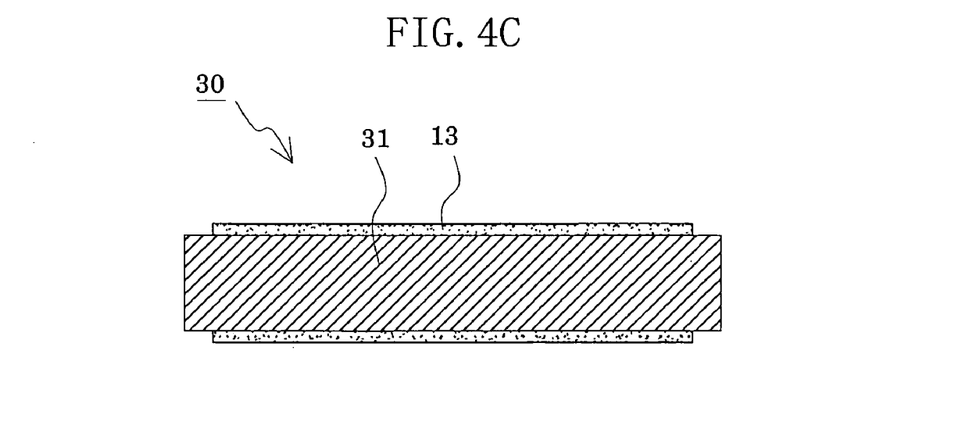
Figure 5A:
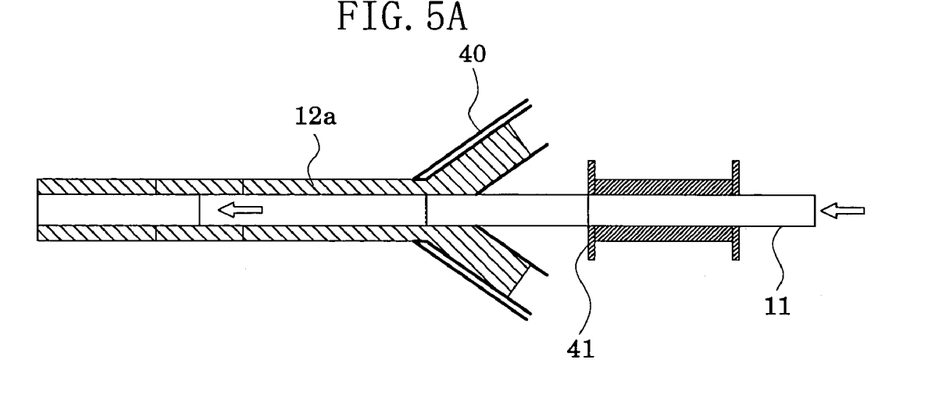
FIGS. 5A to 5C are schematic sectional views showing the steps of manufacturing the charge roll by the method according to the first embodiment.
Figure 5B:
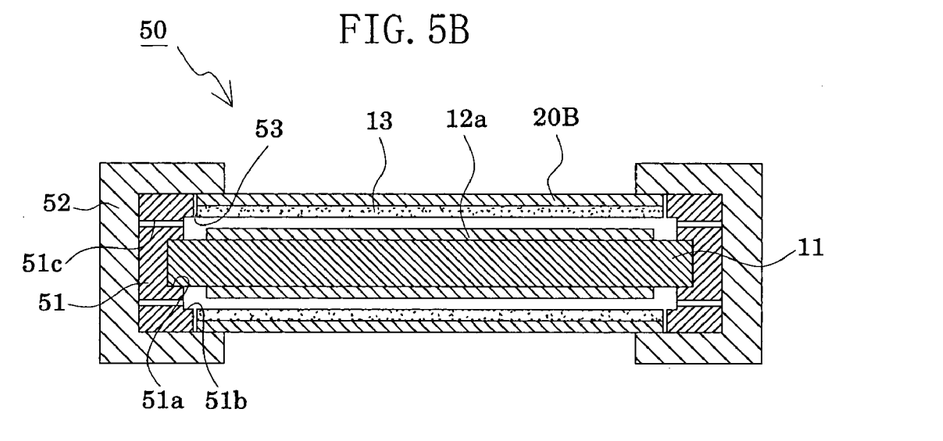
Figure 5C:
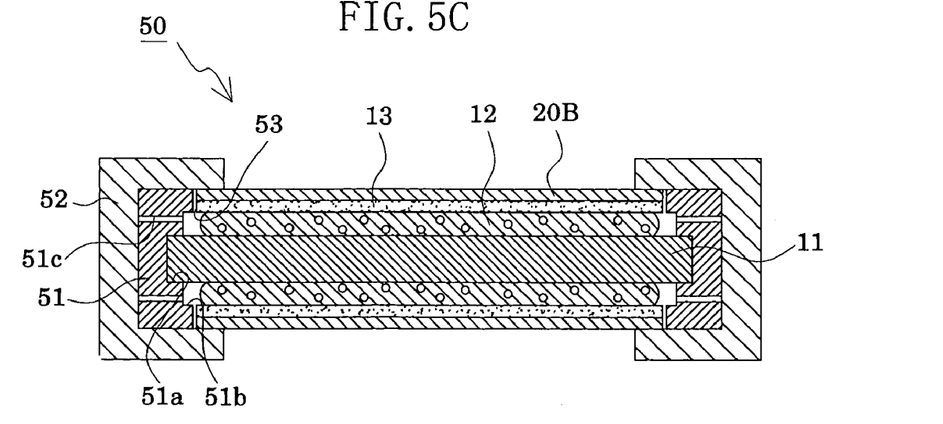

A method of manufacturing the charge roll 10 and a method of manufacturing cylindrical members to be used in corresponding molds which are used to manufacture the charge roll 10 will next be described with reference to FIGS. 2 to 5. FIGS. 2 and 3 show the steps of manufacturing a cylindrical member by a method according to the first embodiment. FIGS. 4 and 5 show the steps of manufacturing a charge roll by the method according to the first embodiment.

First, a basic method of manufacturing a cylindrical member to be used in a mold will be described.

As shown in FIG. 2A, a cylindrical solid member 200 is drilled from one end by use of a drill 201 so as to form a primary bore 121 that axially extends therethrough, thereby forming a pipe member 120 having the primary bore 121 as shown in FIG. 2B. The solid member 200 is of, for example, a carbon tool steel (SK). The present embodiment uses the solid member 200 of SK105 (JIS G4401).

Next, as shown in FIG. 2B, the pipe member 120 is subjected to external cylindrical turning while the center of the primary bore 121 is used as a reference. In the present embodiment, a pair of conical, rotary retainers 202 are used to hold the pipe member 120 at opposite end portions of the primary bore 121. Rotation of the rotary retainers 202 causes the pipe member 120 to rotate about the center of the primary bore 121. The cutting edge of a cutting tool 203 is brought in contact with the outer surface of the rotating pipe member 120 to thereby perform external cylindrical turning. Since the pipe member 120 undergoes external cylindrical turning while the center of the primary bore 121 is used as a reference, the center of the outer circumferencel of the pipe member 120 and the center of the primary bore 121 coincide with each other.

After undergoing external cylindrical turning, the pipe member 120 is quenched. The pipe member 120 is quenched in order to prevent its deformation which could otherwise result in a later step of, for example, finishing its end face into a reference face 122. Quenching imparts an HRC hardness of 45° or higher, preferably 55° or higher, to the pipe member 120. For example, salt bath quenching can be performed on the pipe member 120 by use of a bath that contains sodium chloride or barium chloride. The pipe member 120 may be quenched to an HRC hardness in excess of 55°. However, when the pipe member 120 is too high in hardness, machining, for example, its end face or bore surface in a later step consumes much time and becomes difficult. Thus, an HRC hardness of the pipe member 120 of about 55° is preferred as measured after quenching. A solid member 200 having an HRC hardness of about 55° may be used. However, since drilling the primary bore 121 and external cylindrical turning consume much time and become difficult, use of a solid member 200 having an HRC hardness lower than 55° is preferred. In the present embodiment, the pipe member 120 is quenched so as to assume an HRC hardness of 55°.

Next, as shown in FIG. 2C, axially opposite end faces of the pipe member 120 are turned by use of the cutting tool 203 to thereby be finished into reference faces 122. In the present embodiment, opposite end faces of the pipe member 120 are finished into the reference faces 122 by means of turning; and when the primary bore 121 is honed in a later step, one of the reference faces 122 is used as a reference. Since the honing step uses one of the reference faces 122, at least one end face of the pipe member 120 may be finished into the reference face 122. However, through finishing opposite end faces of the pipe member 120 into the reference faces 122, no mistake arises in terms of identification of a reference face.

Next, as shown in FIG. 3A, the internal cylindrical surface of the primary bore 121 of the pipe member 120 is honed into a finished bore 21 while one reference face 122 of the pipe member 120 is used as a reference.

Honing for forming the finished bore 21 can be performed by use of, for example, a honing head 300 as shown in FIG. 3A. The honing head 300 includes a plurality of grindstone pieces 301, a holder 302, and a piston rod 303. The holder 302 are divided along the circumferential direction into a plurality of divisions, on which the corresponding grindstone pieces 301 are fixed. The piston rod 303 is provided within the holder 302 in such a manner as to be movable along the axial direction of the holder 302. A contact surface 302a is provided on the inner surface of the holder 302. The surface of a distal end portion of the piston rod 303 is formed into a taper surface 303a, which abuts the contact surface 302a of the holder 302. The piston rod 303 is moved toward the distal end of the holder 302 by means of activating an unillustrated hydraulic piston such that the taper surface 303a comes in a sliding contact with the contact surface 302a of the holder 302, thereby expanding the inside diameter of the holder 302. As a result, the grindstone pieces 301 provided on the outer circumferential surface of the holder 302 are pressed against the wall surface of the primary bore 121 under predetermined pressure. In this state, the holder 302 is rotated by unillustrated drive means, such as a drive motor, to thereby hone the primary bore 121.

Next, as shown in FIG. 3B, external cylindrical turning is performed on the pipe member 120 while the center of the finished bore 21 is used as a reference, thereby yielding a cylindrical member 20 to be used in a cylindrical mold or a foaming mold, which will be described later.

As in the case of the step described above with reference to FIG. 2B, the present embodiment uses the rotary retainers 202 and the cutting tool 203 for performing external cylindrical turning on the pipe member 120.

The above-described method of manufacturing the cylindrical member 20 to be used in a cylindrical mold or a foaming mold has the following advantage. Even when the step of quenching the pipe member 120 causes a degradation in accuracy in inside and outside diameters; i.e., the step of quenching the pipe member 120 produces a deviation between the center of the outer circumference of the pipe member 120 and the center of the primary bore 121, or causes a degradation in axial straightness, the subsequent honing and external cylindrical turning steps eliminate such dimensional impairments, thereby yielding the cylindrical member 20 having high dimensional accuracy. The thus-manufactured cylindrical member 20 has inside and outside diameter errors of ±0.02 mm or less, and an axial straightness deviation of 0.02 mm or less. In the present embodiment, the pipe member 120 is formed from SK105 and quenched to an HRC hardness of 55°, so that honing the pipe member 120 can yield the cylindrical member 20 having an inside diameter error of ±0.01 mm or less. In other words, the cylindrical member 20 has an inside-diameter error of ±0.02 mm or less, preferably ±0.01 mm or less. In the present embodiment, the pipe member 120 undergoes external cylindrical turning while the center of the finished bore 21 is used as a reference, thereby assuming an outside-diameter error of ±0.02 mm or less. However, since the cylindrical member 20 is only required to exhibit high inside-diameter accuracy when used in a cylindrical mold or a foaming mold, which will be described later in detail, the cylindrical member 20 is only required to have high dimensional accuracy at least for the inside diameter such that the cylindrical member 20 has an inside diameter error of ±0.02 mm or less, preferably ±0.01 mm or less. In other words, the step of FIG. 3B of performing external cylindrical turning on the pipe member 120 while using the center of the finished bore 21 as a reference can be excluded, thereby reducing the number of manufacturing steps with a resultant reduction in the cost of manufacture.

Next will be described a method of manufacturing a charge roll by use of a cylindrical mold and a foaming mold, which use the corresponding cylindrical members 20.

First, as shown in FIG. 4A, the elastic layer 13 is formed by use of a cylindrical mold 30, which holds a first cylindrical member 20A formed by the above-describe method and adapted to form the outer cylindrical surface of the elastic layer 13.

The cylindrical mold 30 includes the first cylindrical member 20A, which is manufactured by the above-described method and has inside and outside diameter errors of ±0.02 mm or less, preferably ±0.01 mm or less, and an axial straightness deviation of 0.02 mm or less; a columnar member 31 having an outside diameter smaller than the inside diameter of the first cylindrical member 20A; two blocks 32 provided at corresponding opposite ends of the first cylindrical member 20A and adapted to retain the columnar member 31 within the first cylindrical member 20A; and two presser molds 33 provided at corresponding opposite ends of the columnar member 31 and adapted to coaxially retain the first cylindrical member 20A and the columnar member 31, the presser molds 33 being split molds.

An inlet hole 34 for introducing a softened elastic material and a gas vent 35 for releasing gas are formed in the corresponding blocks 32 and the corresponding presser molds 33 in such a manner as to establish communication between the exterior of the cylindrical mold 30 and a space provided between the inner surface of the first cylindrical member 20A and the outer surface of the columnar member 31.

By use of the thus-configured cylindrical mold 30, the elastic layer 13 is formed by means of, for example, transfer molding or injection molding.

Specifically, an elastic material to be used to form the elastic layer 13 is heated under pressure within a cylinder to thereby be softened. The softened elastic material is introduced under pressure into the cylindrical mold 30; more specifically, into the space provided between the inner surface of the first cylindrical member 20A and the outer surface of the columnar member 31 via the inlet hole 34. The introduced softened elastic material is allowed to cure, thereby forming the elastic layer 13.

The thus-formed elastic layer 13 has a length of 200 mm to 400 mm, an outside diameter of 16 mm or less, and a thickness of 0.3 mm to 1.2 mm.

In the present embodiment, the first cylindrical member 20A has a length of 330 mm, an outside diameter of 22 mm, and an inside diameter of 14 mm; and the columnar member 31 has a length of 350 mm and an outside diameter of 12.8 mm, whereby the elastic layer 13 having a length of 330 mm, an outside diameter of 14 mm, and a thickness of 0.6 mm is formed between the inner surface of the first cylindrical member 20A and the outer surface of the columnar member 31.

Since the inside-diameter accuracy of the elastic layer 13 to be formed by use of the cylindrical mold 30 can be lower than the outside-diameter accuracy, the columnar member 31 can be a commercially available one. However, a columnar member having high outside-diameter accuracy may be used as needed. An ordinary cylindrical member may be used in place of the columnar member 31 so long as the straightness of the cylindrical member is not very poor. Alternatively, the cylindrical member 20 manufactured by the above-described method may be used in place of the columnar member 31.

When the hardness of the columnar member 31 is low, the columnar member 31 is deformed in the course of formation of the elastic layer 13, resulting in deformation of the bore of the elastic layer 13. Preferably, the columnar member 31 has such hardness that prevents deformation of the columnar member 31 in the course of formation of the elastic layer 13; specifically, an HRC hardness of 45° or higher. When the columnar member 31 is higher in hardness than the first cylindrical member 20A, accidental contact between the columnar member 31 and the first cylindrical member 20A during, for example, handling inflicts a flaw on the inner surface of the cylindrical member 20A. Such a flaw on the inner surface of the first cylindrical member 20A is transferred onto the surface of the elastic layer 13 in the course of formation of the elastic layer 13, thus yielding a defective elastic layer 13. Therefore, preferably, the columnar member 31 is lower in hardness than the first cylindrical member 20A.

In the present embodiment, since the first cylindrical member 20A has an HRC hardness of 55°, the columnar member 31 preferably has an HRC hardness equal to 45° or higher and lower than 55°.

Preferably, the above-mentioned predetermined hardness is imparted to the columnar member 31 by means of quenching as in the case of the first cylindrical member 20A. Quenching the columnar member 31 densites the surface of the columnar member 31, thereby hindering migration of molding-related by-products to the columnar member 31 and enhancing resistance to oxidation effected by the by-products. Also, wettability between the columnar member 31 and an activator contained in the elastic member 13 is enhanced, thereby allowing release of the elastic layer 13 from the columnar member 31 without use of a parting agent. Thus, the step of applying a parting-agent becomes unnecessary, thereby simplifying the manufacturing process and reducing the cost of manufacture. In the present embodiment, the columnar member 31 of a carbon tool steel (SK105, JIS G4401) is quenched, whereby an HRC hardness of 45° is imparted thereto.

Corrosion resisting stainless steel, such as PSL (prehardened steel from Hitachi Metals, Ltd.), can be used to form the presser molds 33.

Next, as shown in FIG. 4C, a surface treatment layer is formed on the outer surface of the elastic layer 13.

In the present embodiment, the elastic layer 13 provided on the surface of the columnar member 31 is immersed in a surface treatment liquid to thereby apply the surface treatment liquid to its surface. Then, heat is applied to the surface of the elastic layer 13, thereby forming a surface treatment layer on the outer surface of the elastic layer 13. Alternatively, the elastic layer 13 is released from the columnar member 31 and is then fitted onto another columnar or cylindrical member, followed by formation of the surface treatment layer.

Next, as shown in FIG. 5A, by use of a crosshead die 40, a solid primary layer 12a, which will become the foamed elastic layer 12, is formed on the core 11 by means of side extrusion.

More specifically, the core 11 is positioned and fixed in the crosshead die 40 by means of a core guide 41. While unvulcanized rubber used to form the solid primary layer 12a is being charged into the thus-prepared crosshead die 40 through unillustrated inlet holes, the core 11 is caused to advance, thereby forming the solid primary layer 12a on the core 11 through side extrusion. Subsequently, the core 11 covered with the solid primary layer 12a is cut into pieces each having a predetermined length.

In the present embodiment, since the elastic layer 13 has an outside diameter of 14 mm and a thickness of 0.6 mm, the solid primary layer 12a having a thickness of 2.3±0.1 mm and a thickness variation of 0.1 mm or less is formed on the core 11 having an outside diameter of 8 mm.

Next, by use of a foaming mold 50, the charge roll 10 is formed. The foaming mold 50 uses a second cylindrical member 20B manufactured by the above-described method. The second cylindrical member 20B has the same dimensional accuracy as that of the first cylindrical member 20A; i.e., an accuracy such that the inside and outside diameter errors are ±0.02 mm or less, preferably ±0.01 mm or less, and an axial straightness deviation of 0.02 mm or less. As in the case of the first cylindrical member 20A, the second cylindrical member 20B is formed from a carbon tool steel SK105 (JIS G4401) and quenched to an HRC hardness of 55°.

As shown in FIG. 5B, the foaming mold 50 includes the second cylindrical member 20B, into which the elastic layer 13 formed by the above-described process is inserted; two foaming blocks 51 for retaining corresponding opposite ends of the core 11; and two foaming presser molds 52 provided in opposition to corresponding ends of the second cylindrical member 20B and adapted to coaxially retain the second cylindrical member 20B and the foaming blocks 51, the foaming presser molds 52 being split molds.

Each of the foaming blocks 51 has a recess 51b formed around an engagement hole 51a into which an end of the core 11 is fitted. Gas vents 51c are formed in the foaming blocks 51 in such a manner as to communicate with the recesses 51b. Opposite ends of the second cylindrical member 20B merely face the corresponding foaming blocks 51 such that the recesses 51b communicate with corresponding clearances 53 between the opposite ends of the second cylindrical member 20B and the corresponding foaming blocks 51. Thus, after foaming, a space remains, in each of the recesses 51b, between the foamed elastic layer 12 and each of the foaming blocks 51, and communicates with the gas vents 51c and with the clearance 53.

By use of the thus-configured foaming mold 50, the solid primary layer 12a is foamed as described below, thereby yielding the charge roll 10. First, as shown in FIG. 5B, opposite end portions of the core 11 are fitted into the corresponding engagement holes 51a of the foaming blocks 51. The foaming blocks 51 and the second cylindrical member 20B are retained by means of the foaming presser molds 52.

Next, as shown in FIG. 5C, the foaming mold 50 is heated so as to foam and vulcanize the solid primary layer 12a, thereby forming the foamed elastic layer 12.

The foaming mold 50 is heated by means of, for example, exposure to hot air in a circulating hot-air furnace or direct application of heat from a heater provided within the foaming mold 50.

In order to attain uniform heat distribution in the course of heating, a heat pipe may be embedded in the foaming mold 50. In order to retard foaming of a portion of the solid primary layer 12a located in the vicinity of the gas vents 51c for reliable release of gas, the foaming blocks 51 may be formed from a material having low heat conduction. Alternatively, opposite end portions of the foaming mold 50 may be cooled by means of, for example, a cooling device.

Since the foamed elastic layer 12 is formed by means of foaming the solid primary layer 12a in a space between the previously formed elastic layer 13 and the core 11, the inner surface of the elastic layer 13 impose dimensional regulation on the foamed elastic layer 12. As a result, the step of polishing the foamed elastic layer 12 becomes unnecessary.

The thus-formed charge roll 10 can assume an outside diameter of 14±0.1 mm; i.e., a variation in outside diameter of 0.1 mm or less, and an axial straightness deviation of 0.2 mm or less. The thus-formed elastic layer 13 can have a surface roughness Ra of 1.0 μm or less. Therefore, the step of polishing the surface of the elastic layer 13 becomes unnecessary.

Since the present embodiment uses epichlorohydrin rubber to form the elastic layer 13, and nitrile rubber to form the foamed elastic layer 12, the elastic layer 13 and the foamed elastic layer 12 can be bonded together without use of adhesive, with such strength as not to raise any problem during use of the charge roll 10.

The above-mentioned foaming process establishes a strong bond between the foamed elastic layer 12 and the core 11 as well as a strong bond between the foamed elastic layer 12 and the elastic layer 13. In some cases, particularly in a high-temperature, high-humidity environment, an ordinary charge roll may suffer a problem of rust formation between an elastic layer and a core. However, the present invention can mitigate rust formation by use of nitrile rubber. Since the thickness of the solid primary layer 12a is determined with high accuracy, and since the elastic layer 13, which is formed in the second cylindrical member 20B having a highly accurate inside diameter, imposes dimensional regulation on the foamed elastic layer 12; i.e., foaming conditions are regulated with high accuracy, degree of expansion and the condition of foam can be controlled with high accuracy. Use of nitrile rubber enables the above-mentioned expansion molding.

Since the cylindrical mold 30 and the foaming mold 50 respectively use the first and second cylindrical members 20A and 20B, which are formed with high accuracy in inside and outside diameters and in straightness by the above-mentioned method, the elastic layer 13 can preserve high outside-diameter accuracy; high dimensional accuracy can be preserved after expansion molding; and the elastic layer 13 can be free of a parting line.

Since the elastic layer 13 on which a surface treatment layer is formed undergoes heating while being pressed against the internal cylindrical surface of the second cylindrical member 20B, the surface of the elastic layer 13 becomes smoother, so that toner filming becomes more unlikely to occur.

Quenching the columnar member 31 and the first cylindrical member 20A of the cylindrical mold 30 and the second cylindrical member 20B of the foaming mold 50 densifies their surfaces, thereby hindering migration of molding-related by-products to the columnar member 31, to the first cylindrical member 20A, and to the second cylindrical member 20B and enhancing resistance to oxidation effected by the by-products. Also, wettability between the columnar member 31 and an activator contained in the elastic layer 13, wettability between the activator and the first cylindrical member 20A, and wettability between the activator and the second cylindrical member 20B are enhanced, thereby allowing release of the elastic layer 13 from the columnar member 31, from the first cylindrical member 20A, and from the second cylindrical member 20B without use of a parting agent. Thus, the step of applying a parting agent becomes unnecessary, thereby simplifying the manufacturing process and reducing the cost of manufacture.

Since the columnar member 31 is quenched to thereby assume predetermined hardness, the columnar member 31 is not deformed in the course of molding the elastic layer 13, whereby the elastic layer 13 can be formed with high accuracy. Since the columnar member 31 is lower in hardness than the fist cylindrical member 20A, even accidental contact between the columnar member 31 and the first cylindrical member 20A during, for example, handling does not inflict a flaw on the inner surface of the cylindrical member 20A. Thus, the cylindrical mold 30 can be used for a long period of time, and the cost of manufacture can be reduced.

The cylindrical mold 30 and the foaming mold 50 may be configured as follows: a fluorine-containing resin sleeve or a silicone resin sleeve is fitted into the first and second cylindrical members 20A and 20B so as to improve surface properties of a molded product and to enhance readiness of release of a molded article from the molds 30 and 50. Such a resin sleeve may be formed by use of a cylindrical member of metal formed by the above-described manufacturing method.

EXAMPLES

Example 1

TOKABLACK #4500 (20 parts by weight) as conductive material, sodium trifluoro acetate (0.5 parts by weight), zink flower (5 parts by weight), stearic acid (2 parts by weight), and a vulcanizing agent (1.5 parts by weight) were added to epichlorohydrin rubber (ECO; 100 parts by weight). The resultant mixture was kneaded in a roll mixer. The resultant rubber was injection-molded by the above-described method of the first embodiment. The thus-molded article was steam-vulcanized at a temperature of 150° C. for 1 hour, thereby yielding an elastic layer having an outside diameter of 14 mm and a thickness of 0.6 mm. The elastic layer was surface-treated by use of a surface treatment liquid prepared as follows: ethyl acetate (100 parts by weight), an isocyanate compound (MDI; 20 parts by weight), ACETYLENE BLACK (product of Denki Kagaku Kogyo; 4 parts by weight), and an acryl-silicone polymer (MODIPER FS700 from NOF Corp.; 2 parts by weight) were mixed in a dispersed condition for 3 hours by use of a ball mill. Thus was obtained the elastic layer having a surface treatment layer. Specifically, the elastic layer was immersed in the surface treatment liquid for 60 seconds while the surface treatment liquid was maintained at a temperature of 23° C. Subsequently, the elastic layer was heated for 1 hour in an oven that was maintained at a temperature of 120° C., thereby forming the surface treatment layer.

Next, zink flower (5 parts by weight), stearic acid (1 part by weight), TOKABLACK #5500 (25 parts by weight), DOP (30 parts by weight), a vulcanizing agent (sulfur; 1 part by weight), a vulcanizing aid (3.5 parts by weight), a foaming agent (ADCA; 5 parts by weight), a foaming aid (3 parts by weight), and an inorganic foaming agent (3 parts by weight) were added to nitrile rubber having a nitrile content of 33% (Mooney viscosity ($ML_{1+4}$ at 100° C.) 30; 100 parts by weight). The resultant mixture was kneaded in a roll mixer. By use of the resultant rubber and by the above-described method of the first embodiment, a charge roll was manufactured as follows. A solid primary layer having a thickness of 2.3 mm with a thickness variation of 0.1 mm or less was formed, from the above-prepared rubber, on a core having a diameter of 8 mm. The solid primary layer on the core was heated at a temperature of 157° C. for 30 minutes to thereby be foamed into a foamed elastic layer. As a result, the foamed elastic layer and the elastic layer were united, thereby yielding a charge roll.

Comparative Example 1

By use of materials similar to those used above in Example 1, an elastic layer was formed by the steps of extrusion, vulcanization molding, polishing of an external cylindrical surface, and surface treatment.

By use of materials similar to those used above in Example 1, a solid primary layer was formed on a core by means of side extrusion. Subsequently, the solid primary layer was foamed into a foamed elastic layer through application of heat. The external cylindrical surface of the foamed elastic layer was polished.

Then, an adhesive was applied onto the external cylindrical surface of the foamed elastic layer formed on the core. The thus-prepared foamed elastic layer was covered with the elastic layer. The resultant assembly was heated to thereby bond the foamed elastic layer and the elastic layer together via the adhesive, thereby yielding a charge roll.

Test Example 1

The charge rolls of Example 1 and Comparative Example 1 were measured for outside diameter, axial straightness, and surface roughness by use of a micrometer, a straightness gauge, and a surface roughness meter. The results of measurement are shown below in Table 1.

TABLE 1

| | Example 1 | Comparative Example 1 |
|---|---|---|
| Outside dia. (mm) | 14 ± 0.1 | 14 ± 0.2 |
| Straightness (mm) | 0.1 max. | 0.25 max. |
| Surface roughness Ra (μm) | 1.0 max. | 5.0 max. |

As is apparent from Table 1, the charge roll of Example 1, which was manufactured by the method of the present invention, exhibits higher accuracy in outside diameter and straightness as compared with the charge roll of Comparative Example 1. The charge roll of Example 1 exhibits a surface roughness Ra of 1.0 μm or less, indicating mirror finish. By contrast, the charge roll of Comparative Example 1 exhibits a surface roughness Ra of 5.0 μm or less as a result of employment of polishing.

Test Example 2

Each of the charge rolls of Example 1 and Comparative Example 1 was attached to the charge section of a commercially available laser printer (LP-8600FX from EPSON). Then, images were output from the laser printer.

As a result, in the case of using the charge roll of Comparative Example 1, an uneven solid image, filming, and an non-uniform charge caused by uneven roll nip stemming from poor axial straightness were observed. By contrast, in the case of using the charge roll of Example 1, such phenomena were not observed.

Example 2

As shown below in Table 2, a first cylindrical member having an HRC hardness of 55° was formed from a solid member of a carbon tool steel (SK105, JIS G4401) by the above-described method of the first embodiment. A columnar member used was of SK105 and was quenched so as to assume an HRC hardness of 55°. Presser molds used were of corrosion resisting stainless steel; specifically, PSL (prehardened steel from Hitachi Metals, Ltd.). The first cylindrical member, the columnar member, and the presser molds were used to form a cylindrical mold of Example 2.

Example 3

As shown below in Table 2, a first cylindrical member having an HRC hardness of 55° was formed from a solid member of SK105 by the above-described method of the first embodiment. A columnar member used was of SK105 and was quenched so as to assume an HRC hardness of 45°. Presser molds used were of corrosion resisting stainless steel; specifically, PSL (prehardened steel from Hitachi Metals, Ltd.). The first cylindrical member, the columnar member, and the presser molds were used to form a cylindrical mold of Example 3.

Example 4

As shown below in Table 2, a first cylindrical member having an HRC hardness of 45° was formed from a solid member of SK105 by the above-described method of the first embodiment. A columnar member used was of SK105 and was quenched so as to assume an HRC hardness of 45°. Presser molds used were of corrosion resisting stainless steel; specifically, PSL (prehardened steel from Hitachi Metals, Ltd.). The first cylindrical member, the columnar member, and the presser molds were used to form a cylindrical mold of Example 4.

Comparative Example 2

For comparison, as shown below in Table 2, a first cylindrical member used was of a carbon steel for machine structural use (S45C, JIS G4051). A first cylindrical member was formed by the steps of performing external cylindrical turning on a cylindrical-member workpiece while using the bore of the cylindrical-member workpiece as a reference, and honing the bore. The first cylindrical member was not quenched and had an HRC hardness of 15°. A columnar member of S45C having an HRC hardness of 16° was used without employment of quenching. The columnar member had Kanigen plating (electroless nickel plating) performed thereon. Presser molds used were of S45C and had Kanigen plating (electroless nickel plating) performed thereon. The first cylindrical member, the columnar member, and the presser molds were used to form a cylindrical mold of Comparative Example 2.

Comparative Example 3

For comparison, as shown below in Table 2, a first cylindrical member having an HRC hardness of 40° was formed from a solid member of S45C by the above-described method of the first embodiment. A columnar member of S45C having an HRC hardness of 16° was used without employment of quenching. The columnar member had Kanigen plating (electroless nickel plating) performed thereon. Presser molds used were of S45C and had Kanigen plating (electroless nickel plating) performed thereon. The first cylindrical member, the columnar member, and the presser molds were used to form a cylindrical mold of Comparative Example 3.

Test Example 3

The first cylindrical members of the cylindrical molds of Examples 2 to 4 and the first cylindrical members of the cylindrical molds of Comparative Examples 2 and 3 were measured for inside-diameter accuracy and inner-circumference axial straightness by use of a micrometer and a straightness gauge. By use of the cylindrical molds of Examples 2 to 4 and the cylindrical molds of Comparative Examples 2 and 3, charge rolls were formed from materials similar to those used above in Example 1 by the method similar to that of Example 1. The charge rolls were measured for outside-diameter accuracy and external axial straightness by use of a micrometer and a straightness gauge. The condition of readiness in parting the elastic layers from the corresponding cylindrical molds was examined to thereby determine whether or not a parting agent was necessary. The cylindrical molds were tested for durability in shot count in order to test durability against repeated use. The measurement and test results are shown below in Table 2.

TABLE 2

| | | | Example 2 | Example 3 | Example 4 | Comp. Example 2 | Comp. Example 3 |
|---|---|---|---|---|---|---|---|
| Mold | First cylindrical member | Material type | Solid member | Solid member | Solid member | Pipe | Solid member |
| | | Material | SK105 | SK105 | SK105 | S45C | S45C |
| | | Quenching/HRC | Quenched/55° | Quenched/55° | Quenched/45° | Non/15° | Quenched/40° |
| | | Plating | Non | Non | Non | Yes | Non |
| | Columnar member | Material | SK105 | SK105 | SK105 | S45C | S45C |
| | | Quenching/HRC | Quenched/55° | Quenched/45° | Quenched/45° | Non/16° | Non/16° |
| | | Plating | Non | Non | Non | Yes | Yes |
| | Presser molds | Material | PSL | PSL | PSL | S45C | S45C |
| | | Plating | Non | Non | Non | Yes | Yes |
| Mold accuracy | Inside dia. error (mm) | | ±0.01 | ±0.01 | ±0.01 | ±0.05 | ±0.02 |
| | Inner-circumference axial straightness deviation (mm) | | 0.02 | 0.02 | 0.02 | 0.30 | 0.03 |
| Molded article (Elastic layer) | Outside-dia. error (mm) | | ±0.10 | ±0.10 | ±0.10 | ±0.30 | ±0.20 |
| | Outer-circumference axial straightness deviation (mm) | | 0.10 | 0.10 | 0.10 | 0.45 | 0.20 |
| Mold workability | Parting agent | | Not required | Not required | Not required | Required | Not required |
| Mold durability | Discoloration | | Non | Non | Non | Blackened | Blackened |
| | Rust | | Non | Non | Non | Formed | Formed |
| | Flaw on inner surface | | Yes | Non | Yes | Yes | Non |
| Durability in shot count | | | 1,000 min. | 1,000 min. | 1,000 min. | 500 max. | 500 max. |

As shown in Table 2, the first cylindrical members of Examples 2 to 4 exhibit a high inside-diameter accuracy (inside diameter error: ±0.01 mm or less) and a high inner-circumference axial straightness (straightness deviation: 0.02 mm or less). The charge rolls that were formed by use of the cylindrical molds of Examples 2 to 4 exhibit a high outside-diameter accuracy (outside diameter error: ±0.10 mm or less) and a high outer-circumference axial straightness (straightness deviation: 0.01 mm or less). By contrast, the first cylindrical members of Comparative Examples 2 and 3 are lower in inside-diameter accuracy and inner-circumference axial straightness than the first cylindrical members of Examples 2 to 4. As a result, the charge rolls that were formed by use of the cylindrical molds of Comparative Examples 2 and 3 are poor in outside-diameter accuracy and outer-circumference axial straightness. In the case of Comparative Example 3, the first cylindrical member is formed from a solid member of S45C by a method similar to that of Examples 2 to 4 and assumes an HRC hardness of 40° by means of subjection to quenching. Thus, the first cylindrical member of Comparative Example 3 can have an inside-diameter error of ±0.02 mm or less, but has an increased inner-circumference axial straightness deviation of 0.03 mm or less. The charge roll that was formed by use of the cylindrical mold of Comparative Example 3 is poor in outside-diameter accuracy and outer-circumference axial straightness. Therefore, preferably, SK105 is used to form the first cylindrical member, and an HRC hardness of 45° or more is imparted to the first cylindrical member by means of quenching.

The cylindrical molds of Examples 2 to 4 and Comparative Example 3 allowed easy release of the corresponding elastic layers therefrom; thus, the elastic layers could be formed without need to use a parting agent. This is because quenching the first cylindrical member densifies its surfaces, thereby hindering migration of by-products generated in the course of molding of the elastic layer to the cylindrical mold, enhancing resistance to oxidation effected by the by-products, and enhancing wettability between the first cylindrical member and an activator contained in the elastic layer. By contrast, the cylindrical mold of Comparative Example 2 failed to allow easy release of the elastic layer therefrom; thus, use of a parting agent was required.

The cylindrical molds of Examples 2 to 4 and the cylindrical molds of Comparative Examples 2 and 3 were subjected to a durability test in order to test durability against repeated use. After the durability test, the cylindrical molds of Examples 2 to 4 did not exhibit any discoloration, whereas the cylindrical molds of Comparative Examples 2 and 3 discolored to black even after several times of use.

After being used a plurality of times, the cylindrical molds of Examples 2 to 4 and the cylindrical molds of Comparative Examples 2 and 3 were allowed to stand for one week. The cylindrical molds of Examples 2 to 4 did not exhibit any rust formation, whereas the cylindrical molds of Comparative Examples 2 and 3 exhibited rust formation.

Even after being used repeatedly, the cylindrical molds of Example 3 and Comparative Example 3 were free from infliction of a flaw on the inner surfaces of their first cylindrical members. The reason for this is as follows. Since the first cylindrical members of Example 3 and Comparative Example 3 are higher in hardness than the corresponding columnar members, even accidental contact between the first cylindrical members and the corresponding columnar members during, for example, handling does not inflict a flaw on the inner surfaces of the first cylindrical members of higher hardness, but only inflicts a flaw on the surfaces of the corresponding columnar members. A flaw on the inner surface of the first cylindrical member is transferred onto the surface of the elastic layer in the course of formation of the elastic layer, thus yielding a defective elastic layer. However, even when a flaw on the outer surface of the columnar member is transferred onto the inner surface of the elastic layer, no problem arises during use of a charge roll.

As in the case of the cylindrical mold of Comparative Example 3, when the hardness of the columnar member is too low, the columnar member is deformed in the course of formation of the elastic layer, resulting in deformation of the bore of the elastic layer. Thus, preferably, as in the case of Example 3, the columnar member has hardness lower than that of the first cylindrical member, but the hardness is such that the columnar member is not deformed in the course of formation of the elastic layer; specifically, an HRC hardness of about 45°.

The cylindrical molds of Examples 2 to 4 and the cylindrical molds of Comparative Examples 2 and 3 were tested for durability against repeated use to form charge rolls. The cylindrical molds of Examples 2 to 4 could form charge rolls in an amount of 1,000 shots or more without involvement of any problem. By contrast, in the case of the cylindrical molds of Comparative Examples 2 and 3, when charge rolls were formed in an amount of 500 shots or more, transfer of a crack mark onto the surface of a charge roll began to be observed. A crack that caused such a crack mark was found to be formed as follows. As a result of repeated use of the cylindrical mold, the inner surface of the first cylindrical member discolored to black. A substance that caused the discoloration to black accumulated and cracked as a result of contact with acid.

As is apparent from the above-described test results, the first cylindrical members of Examples 2 to 4 can be formed with such high accuracy that inside-diameter error is ±0.01 mm or less and inner-circumference axial straightness deviation is 0.02 mm or less. A charge roll formed by means of a cylindrical mold using such a first cylindrical member can assume such very high accuracy that the outside-diameter error is ±0.01 or less and the outer-circumference axial straightness is 0.10 mm or less.

Use of the quenched cylindrical molds of Examples 2 to 4 eliminates the need to use a parting agent. Thus, the step of applying a parting agent becomes unnecessary, thereby simplifying the manufacturing process and reducing the cost of manufacture.

The cylindrical molds of Examples 2 to 4 can be free from discoloration and rust formation even when used repeatedly. Also, the cylindrical molds can be used over a long period of time; specifically, their durability in shot count is 1,000 shots or more. Particularly, in the case of the cylindrical mold of Example 3; i.e., a cylindrical mold in which a columnar member is lower in hardness than a first cylindrical member, the first cylindrical member is free from infliction of a flaw on its inner surface even when used repeatedly, so that a molding defect stemming from such a flaw does not occur. Thus, the cylindrical mold can be used over a long period of time, and the cost of manufacture can be reduced.

(Other Embodiments)

While the present invention has been described with reference to the first embodiment, the present invention is not limited thereto.

For example, the first embodiment uses nitrile rubber to form the foamed elastic layer 12 of the charge roll 10. However, the present invention is not limited thereto. For example, silicone rubber, polyurethane, EPDM, or epichlorohydrin rubber may be used to form the foamed elastic layer 12.

The first embodiment uses epichlorohydrin rubber to form the elastic layer 13 of the charge roll 10. However, the present invention is not limited thereto. For example, silicone rubber, polyurethane, EPDM, or nitrile rubber may be used to form the elastic layer 13.

The first embodiment selects material for the foamed elastic layer 12 and material for the elastic layer 13 such that the foamed elastic layer 12 and the elastic layer 13 can be bonded together without application of an adhesive to the elastic layer 13 to be set in the foaming mold 50. However, an adhesive may be applied to the elastic layer 13. When electric conduction needs to be established between the foamed elastic layer 12 and the elastic layer 13, a conductive adhesive may be used.

The first embodiment is described while mentioning a method of manufacturing a charge roll. However, the present invention is not limited thereto. For example, the present invention can be applied to manufacture of other two-layer rolls having high dimensional accuracy, such as developing rolls, transfer rolls, and transport rolls.

In the first embodiment, in the course of manufacturing the cylindrical member 20, the primary bore is honed into a finished bore having the axially uniform diameter. However, the present invention is not limited thereto. For example, the finished bore may assumes such a crown shape whose diameter decreases gradually toward opposite ends from a longitudinally central portion thereof. Such a crown shape can be readily formed as follows: a tapered surface is provided on a grindstone of a honing head, and the pressure for bringing the grindstone into contact with a primary bore is changed.

What is claimed is:

1. A method of manufacturing a two-layer roll having a foamed elastic layer provided on a core, and an elastic layer provided on the foamed elastic layer, the method comprising the steps of:

forming the elastic layer, which has a length of 200 mm to 400 mm and outside diameter of 16 mm or less, by use of a cylindrical mold holding a first cylindrical member used to form an outer cylindrical surface of the elastic layer, the first cylindrical member being manufactured by means of machining a solid member, and the first cylindrical member having an inside-diameter error of ±0.02 mm or less and an axial straightness deviation of 0.02 mm or less;

forming a solid primary layer, which has a length of 200 mm to 400 mm and is to be foamed into the foamed elastic layer, on the core by means of side extrusion;

setting the formed elastic layer and the core having the solid primary layer formed thereon in a second cylindrical member of a foaming mold, the second cylindrical member having an inside-diameter error and an axial straightness deviation substantially equal to those of the first cylindrical member; and foaming the solid primary layer into the foamed elastic layer within the foaming mold including the elastic layer and the core to form the two-layer roll having the foamed elastic layer and the elastic layer, the foamed elastic layer and the elastic layer having a length of 200 mm to 400 mm.

2. A method of manufacturing a two-layer roll according claim 1, wherein the first and second cylindrical members have an inside-diameter error of ±0.01 mm or less.

3. A method of manufacturing a two-layer roll according to claim 1, wherein a method of manufacturing each of the first and second cylindrical members comprises the steps of:

drilling a primary bore in the solid member, which serves as a cylindrical-member workpiece;

performing external cylindrical turning on the cylindrical-member workpiece while using the center of the primary bore as a reference;

finishing at least one end face of the cylindrical-member workpiece into a reference face; and honing an internal cylindrical surface of the primary bore while using the reference face as a reference, thereby obtaining a finished bore.

4. A method of manufacturing a two-layer roll according to claim 3, wherein the method of manufacturing each of the first and second cylindrical members further comprises the step of quenching the cylindrical-member workpiece, before the step of finishing an end face of the cylindrical-member workpiece into a reference face.

5. A method of manufacturing a two-layer roll according to claim 4, wherein a parting agent is not used for formation of the elastic layer.

6. A method of manufacturing a two-layer roll according to claim 3, wherein in the step of finishing an end face of the cylindrical-member workpiece into a reference face, opposite end faces of the cylindrical-member workpiece are finished into corresponding reference faces.

7. A method of manufacturing a two-layer roll according to claim 3, wherein the method of manufacturing the second cylindrical member further comprises the step of, after the step of forming the finished bore, performing external cylindrical finishing on the cylindrical-member workpiece while using the center of the finished bore as a reference.

8. A method of manufacturing a two-layer roll according to claim 1, wherein an external cylindrical surface of the elastic layer does not undergo polishing and is treated by use of a surface treatment liquid that contains isocyanate, thereby forming a surface treatment layer.

9. A method of manufacturing a two-layer roll according to claim 8, wherein the surface treatment liquid further contains at least either a conductivity imparting agent or at least one polymer selected from acrylic fluorine-containing polymers and acryl-silicone polymers.

10. A method of manufacturing a two-layer roll according to claim 8, wherein the surface treatment is performed before or after the step of foaming.

11. A method of manufacturing a two-layer roll according to claim 1, wherein an adhesive agent is not provided between the foamed elastic layer and the elastic layer.

12. A method of manufacturing a two-layer roll according to claim 1, wherein the elastic layer has a thickness of 0.3 mm to 1.2 mm.

* * * * *